Aug. 20, 1935. F. O. BALL 2,011,994
INTAKE MANIFOLD
Filed May 23, 1932 2 Sheets-Sheet 2
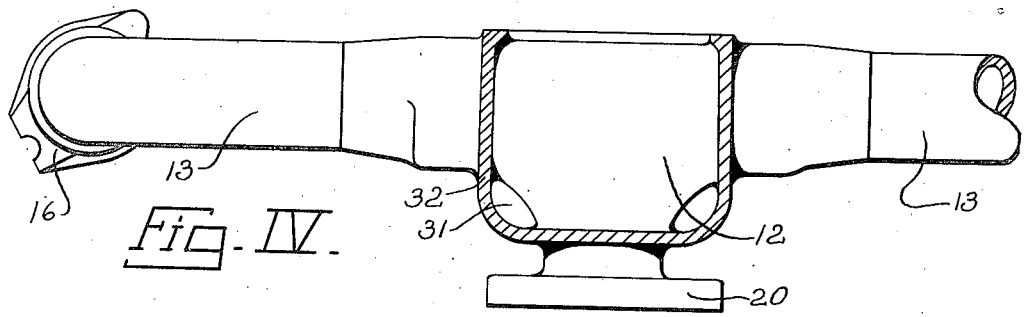
Fig. IV.
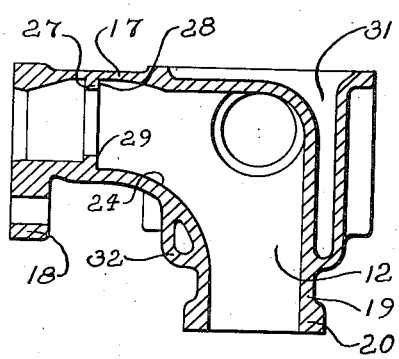
Fig. V.
INVENTOR.
FREDERICK O. BALL.
BY
ATTORNEYS.

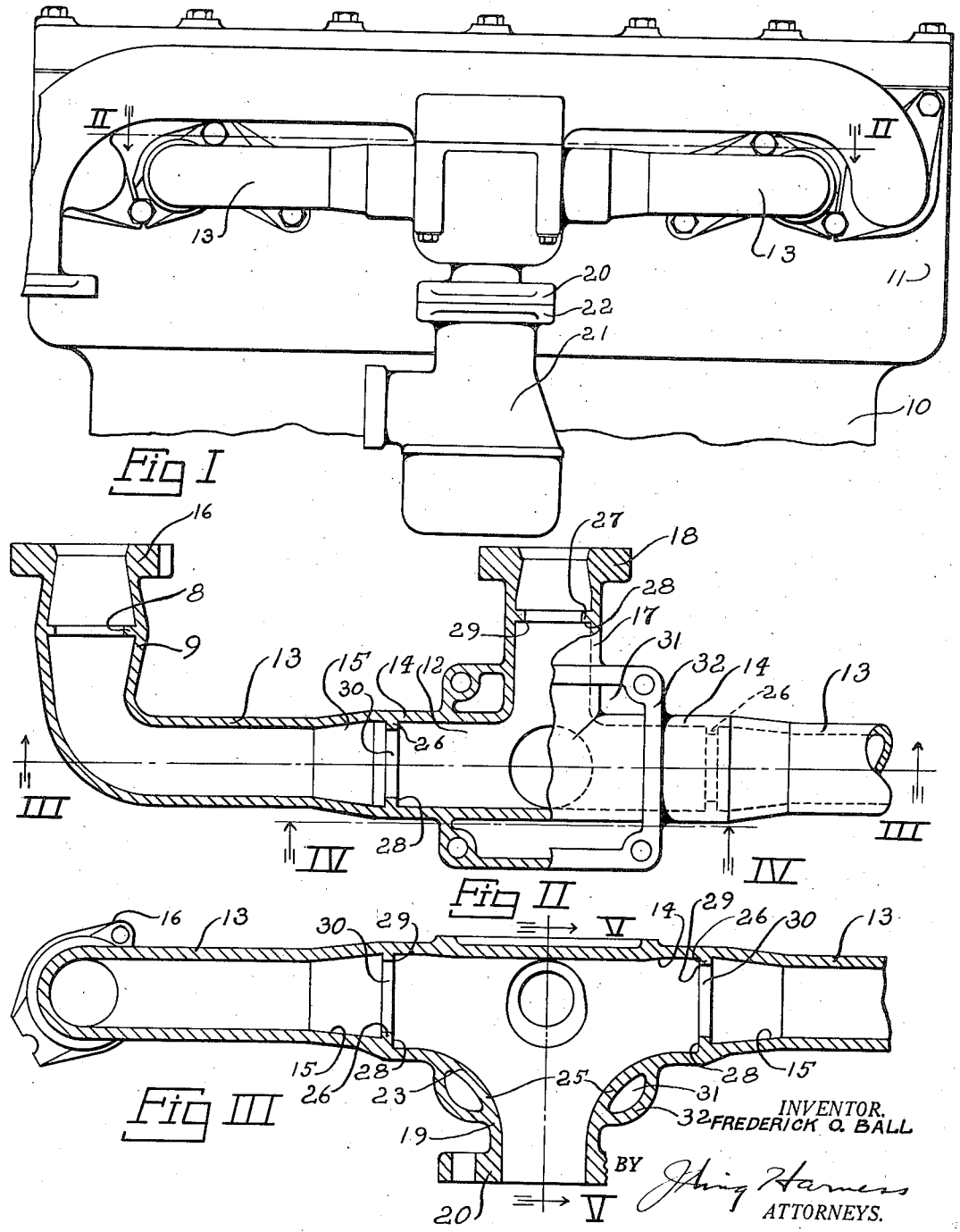

Patented Aug. 20, 1935

2,011,994

UNITED STATES PATENT OFFICE 2,011,994

INTAKE MANIFOLD

Frederick O. Ball, Detroit, Mich., assignor to Chrysler Corporation, Detroit, Mich., a corporation of Delaware Application May 23, 1932, Serial No. 612,927

5 Claims. (Cl. 123—52)

This invention relates to an improved internal combustion engine intake manifold.

Manifolds of this character generally include a distribution zone having a fuel mixture inlet and branches which extend from the zone of distribution to the fuel ports of a cylinder block. The shape of the passage in the fuel mixture inlet and the contour of its walls materially influences the fuel mixture delivering capacity of the inlet. The capacity and flow characteristics of the manifold are improved by providing the fuel mixture inlet with a flaring end having walls of rounded contour adjacent the distribution zone. Such contour, however, encourages the creepage and flow of liquid fuel along the walls of the inlet to the distribution zone from which, without proper precaution, it readily flows to the outlets of the manifold branches and result in undesirable, irregular feeding of slugs of fuel in liquid state to the combustion chambers of the engine.

The main objects of the invention are to provide means for preventing the flow of fuel in liquid state along the walls of the branches of a manifold which includes a distribution zone having a flaring fuel mixture inlet; to provide a fuel mixture inlet having a flaring end adjacent the distribution zone of the manifold which materially increases the fuel mixture feeding capacity of the inlet and accordingly increases the horse power of the engine with which the manifold is associated; and to provide the inlet with flaring side walls of rounded curvature so as to augment the area of those portions of the walls of the fuel mixture inlet which are conventionally heated by the exhaust gases of an engine.

Other objects of the invention are to provide substantially circular dams for preventing the passage of liquid fuel through the manifold branches and which direct the liquid fuel that normally creeps along the walls of a flaring fuel inlet of the above character into the inner portion of the air courses of the branches so as to enable atomization of such liquid fuel; to provide the branches of a manifold with enlarged end portions adjacent the distribution zone therefor accommodating the circular dams and permitting the passages through the dams to be equal to the passages extending throughout the main lengths of the branches.

An illustrative embodiment of the invention is shown in the accompanying drawings, in which:

Fig. 1 is a fragmentary side elevation of a multiple cylinder internal combustion engine which is equipped with my improved manifold.

Fig. 2 is a fragmentary horizontal sectional view, partly in elevation, taken on the line II—II of Fig. 1.

Fig. 3 is a vertical sectional view taken on the line III—III of Fig. 2.

Fig. 4 is a plan view, partly in horizontal section, taken on the line IV—IV of Fig. 2.

Fig. 5 is a transverse vertical sectional view taken on the line V—V of Fig. 3.

In the form shown, my improved intake manifold is illustrated in conjunction with a multiple cylinder internal combustion engine 10 which includes a cylinder block 11 having Siamesed inlet ports, each communicating with two adjacent combustion chambers of the engine. The manifold has a central distribution zone 12 from which branches 13 extend in respectively opposite directions. The passages in the inner end portions 14 of the branches 13 are somewhat larger in cross section than the cross-sectional areas of the passages in the main lengths of the branches. The portions 15 of the passage connecting the enlarged end portions 14 of the branches with the remaining parts thereof are substantially frustoconical in shape. The end portions of the branches 13 extend substantially normal to the length of the manifold and they are provided at their extremities with flanges 16 for securing the manifold to the cylinder block 11 in the conventional manner. A manifold for a 4-cylinder engine requires only two branches, but in the 6-cylinder manifold illustrated, a third branch 17 is provided which leads directly from the central portion of the side wall of the distribution zone 12 to the Siamesed inlet ports of the intermediate pair of cylinders of the engine. The branch 17 has a flange 18 on its outer extremity which is adapted to be clamped against the side wall of the cylinder block 11 in a conventional manner.

Communicating with the lower side of the distribution zone 12 is a fuel mixture inlet 19 having a flange 20 on its lower extremity for supporting a carburetor 21 which is provided with a flange 22 that is bolted or otherwise suitably secured to the flange 20 of the inlet riser. The end 23 of the inlet riser 19 which is adjacent to the distribution zone 12 flares outwardly in three different directions and has rounded rear and side walls 24 and 25, respectively, of substantially circular curvature, which lead to the inner ends of the center branch 17 of the manifold and to the side branches 13 thereof, respectively. The rounded flaring walls of the inlet riser 19 materially reduce impedance to the flow of fuel mixture through the riser to the distribution zone and in this manner they increase the capacity of the manifold and accordingly increase the horse power of the engine with which the manifold is associated.

The flaring contour of the upper end of the inlet riser and the rounded curvature of the walls thereof, however, tends to encourage the flow and creepage of the liquid fuel along the walls of the inlet riser to the distribution zone 12. In order to prevent the admission of such fuel in a liquid state into the branches of the manifold, circular dams 26 are provided in the enlarged end portions 14 of the branches 13, and a similar circular flange 27 is formed in the central branch 17 of the manifold. These circular dams have side faces 28 which prevent the flow of liquid fuel from the surfaces of the walls of the distribution zone 12 and inlet riser 19 to the surfaces of the walls of the respective branches of the manifold. The dams also have sharply defined edges 29 from which the liquid fuel that accumulates adjacent the side faces 28 may be blown off and introduced into the central portions of the passages of the manifold by the velocity of the fuel mixture flowing therethrough. By forming the dams in the enlarged end portions 14 of the branches it is possible to provide passages 30 through the dams which are equal in cross-sectional area to the cross-sectional area of the main lengths of the passages. With this construction the dams effectively prevent the flow of liquid fuel along the walls of the passages and direct the liquid fuel into the central portions of the fuel mixture courses without obstructing the flow of fuel mixture.

If desired, further precaution against the admission of slugs of liquid fuel to the combustion chamber of an engine can be taken by providing a continuous circular dam 8 slightly in advance of the outlet of each outer end portion of the branches 13. The walls 9 of the end portions are belled outwardly at the locations of the dams 8 so as to preserve the capacity of the fuel mixture passage and to subject the streams of fuel mixture to a reduction in velocity just before they reach the dams, the velocity being increased as the fuel mixture streams pass through the circular dams. The radially disposed faces of the dams prevent the flow and creepage of liquid fuel along the walls of the branch passages to the outlets thereof and the change in velocity of the fuel mixture streams produces a turbulence which causes the liquid fuel which is arrested by the dams to be broken up into fine particles and thoroughly distributed throughout the central portions of the fuel mixture streams. The amount of protrusion of the dams 8, 26, and 27 from the inner surfaces of the wall portions of the fuel passages adjacent the dams can be varied to produce an equal distribution of fuel through the three outlets of the manifold.

An exhaust gas receiving chamber 31 having external walls 32 is provided around the distribution zone 12 for heating the fuel mixture and aiding in the vaporization thereof. The inner wall of this chamber and the wall of the distribution zone are common and part of the flaring wall 23 of the intake riser 19 is common with the inner wall of the chamber 31. With this construction the flaring rounded walls of the intake riser are effectively heated and part of the film of liquid fuel which creeps along these walls and which accumulates adjacent the side faces 28 of the dams is vaporized. The reversal in the direction of flow of fuel mixture in the passages of the manifold, due to the alternate suction impulses created by the strokes of the pistons in the various cylinders of the engine, causes the fuel which is arrested by the dams 26 and 27 to surge back and forth over the rounded wall portions of the inlet manifold until the fuel is vaporized by the heat derived from the exhaust gases or diverted by the dams into the central portions of the streams of fuel mixture flowing through the branches.

With a manifold of the above construction, the advantages of the flaring contour of the end of the riser adjacent the distribution zone are obtained, the distribution of the fuel is improved, and the passage of fuel in a liquid state to the engine is effectively guarded against.

Although but one specific embodiment of the invention is herein shown and described, it will be understood that various changes in the size, shape, and arrangement of parts may be made without departing from the spirit of my invention and it is not my intention to limit its scope other than by the terms of the appended claims.

What I claim is:

1. A manifold including a distribution zone, a fuel mixture inlet having a flaring discharge end portion communicating with said distribution zone, branches leading from said distribution zone having a substantially unobstructed path for fuel mixture, and dams in the inlet ends of said branches adjacent said distribution zone extending towards the centers of said branches having passages therethrough substantially equal in capacity to the main lengths of the passages in said branches.

2. A manifold including a distribution zone, tubular branches leading from said distribution zone having portions of their passages adjacent the distribution zone of larger cross sectional area than the cross sectional area of the main lengths of said passages, and ring-like dams in the portions of said passages of larger cross sectional area extending inwardly toward the centers of said branches and terminating substantially in alignment with the internal surface of the main length of said passages, said dams having openings therethrough substantially equal in area to the cross sectional area of the main lengths of said passages.

3. A manifold including a distribution zone, a fuel mixture inlet having a flaring end portion communicating with said zone of distribution including inner wall surfaces of rounded contour, tubular branches leading from said zone of distribution having portions of their passages adjacent the distribution zone of larger cross sectional area than the cross sectional area of the main lengths of said passages, and ring-like dams in the portions of said passages of larger cross sectional area extending inwardly toward the centers of said branches and having openings therethrough substantially equal in area to the cross sectional area of the main lengths of said passages.

4. A manifold including a distribution zone and having tubular branches leading therefrom for conveying fuel mixture to an engine, the ends of said branches adjacent said distribution zone being provided with passages of larger cross section than that of the passages of the main lengths of said branches, and a ring shaped dam in the end of each branch adjacent said distribution zone having a side face substantially normal to the surface of the inner wall of said branch and having a sharply defined inner edge located substantially in alignment with the walls of the passages of the main length of said branch.

5. A manifold including a fuel mixture inlet and having a tubular branch leading therefrom for conveying fuel mixture to an engine, a selected portion of said branch being provided with a passage of larger cross section than that of the passage of the main length of said branch, and a dam in the portion of the passage of said branch of greater cross section having a side face substantially normal to the surface of the internal wall of said branch and having a sharply defined inner edge located substantially in alignment with the walls of the passage of the main length of said branch.

FREDERICK O. BALL.